J. E. NORWOOD.
PISTON RING.
APPLICATION FILED AUG. 14, 1918.

1,304,360

Patented May 20, 1919.

INVENTOR
John E. Norwood
By
Chapin A Ferguson
ATTORNEY

UNITED STATES PATENT OFFICE.

JOHN E. NORWOOD, OF BALTIMORE, MARYLAND.

PISTON-RING.

1,304,360.　　　　Specification of Letters Patent.　　Patented May 20, 1919.

Application filed August 14, 1918. Serial No. 249,782.

*To all whom it may concern:*

Be it known that I, JOHN E. NORWOOD, a citizen of the United States, residing at Baltimore, in the State of Maryland, have invented certain new and useful Improvements in Piston-Rings, of which the following is a specification.

This invention relates to improvements in piston rings and has for its object to provide a supplemental ring which coöperates with the piston ring or rings to prevent the oil from working around and over the piston rings to the firing chamber, and to prevent the gas in the firing chamber from passing around the piston ring, and also to provide means to allow the oil that works under and back of the piston rings to drop back into the crank case.

The invention consists of the novel construction and arrangement of the parts and combination of parts hereinafter more fully set forth in the following specification and pointed out in detail in the appended claims.

In the accompanying drawing,—

Figure 1:
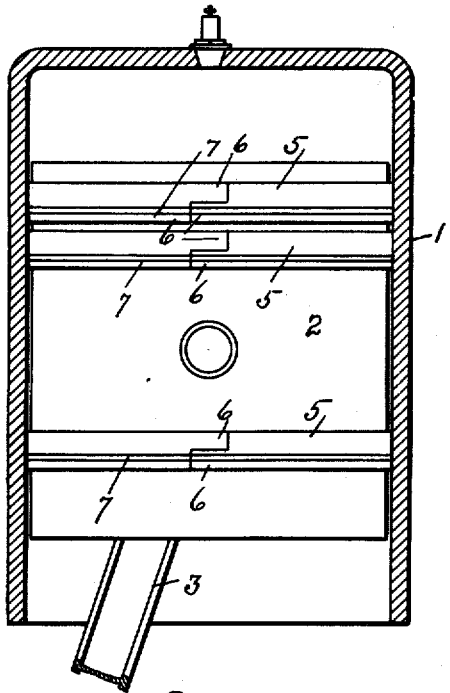
Figure 1 is a vertical section of a cylinder, the piston therein having my invention applied thereto.
Figure 2:
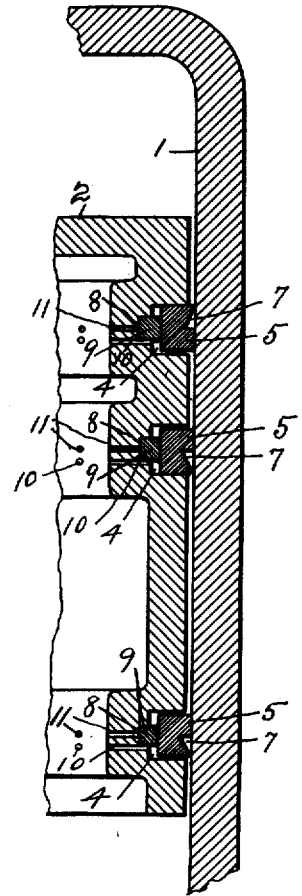
Fig. 2 is an enlarged section of a portion of the cylinder and piston.

Referring to the accompanying drawings, forming part of this specification, and in which like reference numerals designate like parts throughout the several views, 1 designates a cylinder and 2 the piston, the latter being operated in the cylinder through the medium of the rod 3 leading to the crankshaft (not shown) of the engine. The said piston is provided with annular grooves 4 into which the piston rings 5 fit. Said rings 5 each have overlapping ends 6 and annular recesses 7 one surface of which is cut at right angles to the face of the ring and the other surface is inclined so that when the piston moves in one direction the straight surface will force the oil into the recess 7 and when the piston moves in the opposite direction the inclined surface of the recess 7 will cause the oil to spread on the side of the cylinder. The inner surface of the grooves 4 is provided with a smaller annular groove 8 into each of which latter a supplemental ring 9 is fitted; said rings 9 have their outer surfaces impinging against the inner surface of the piston rings. Leading from each of the grooves 4 and 8 are a number of apertures 10 and 11, respectively, passing through the side of the piston to allow the oil to drop back into the crank case. In practice when the piston 2 moves down the rings 5 are against the top of their grooves which forces the oil under and back of the piston rings 5 until it strikes the supplemental rings 9 which latter will prevent the oil working over the piston rings when the piston is forced up again, as in the case with the piston rings in present use. When the oil strikes the supplemental rings 9 it will pass through the apertures 10 to the crank case, and any oil which might work back of the supplemental rings 9 will drain through the apertures 11 and also drop back into the crank case.

Figure 3:
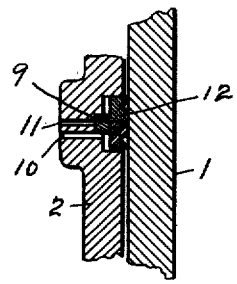
Fig. 3 is a modification showing the piston ring in two sections.

In Fig. 3 I have shown a modification of the piston ring 12, the same being made in two sections.

While I have shown and described a piston ring with a groove in its outer surface, and also a piston ring formed of two sections, any other desired form of piston ring may be employed with the supplemental ring.

It will be seen that by the use of my present invention the piston will be well oiled, but that no oil can pass by the piston rings and into the firing chamber as the supplemental rings 9 fit closely in the grooves 8 and at all times impinge against the piston rings, and are not affected by centrifugal force or vacuum, and the oil that works under the piston rings 5 will strike the supplemental rings 9 and pass off through the apertures 10 to the crank case, and any oil that may work back of said supplemental rings 9 will drain through the apertures 11 and also drop back into the crank case.

Having thus described my invention, what I claim is:

1. The combination of a piston having an annular groove in its outer surface provided with apertures leading to the inside of the piston and a smaller annular groove at the back of the first named annular groove and also provided with apertures leading from said smaller groove to the inside of the piston, a piston ring fitted in the said first-named annular groove, and a supplemental ring fitted in said smaller annular groove and impinging against the piston ring.

2. The combination of a piston having annular grooves in its outer surface each provided with apertures leading to the inside of the piston and a smaller annular groove back of each of said first named annular grooves and also provided with apertures leading to the inside of the piston, a piston ring in each of said first named annular grooves and each having a recess in its outer face one surface of which is cut at right angles to the face of the rings and the other surface is inclined, and a supplemental ring fitted in each of said smaller annular grooves and impinging against the piston rings.

In testimony whereof I affix my signature.

JOHN E. NORWOOD.